July 9, 1946.  J. G. VILLEPIGUE  2,403,835
RETRACTABLE LANDING GEAR
Filed Dec. 16, 1941
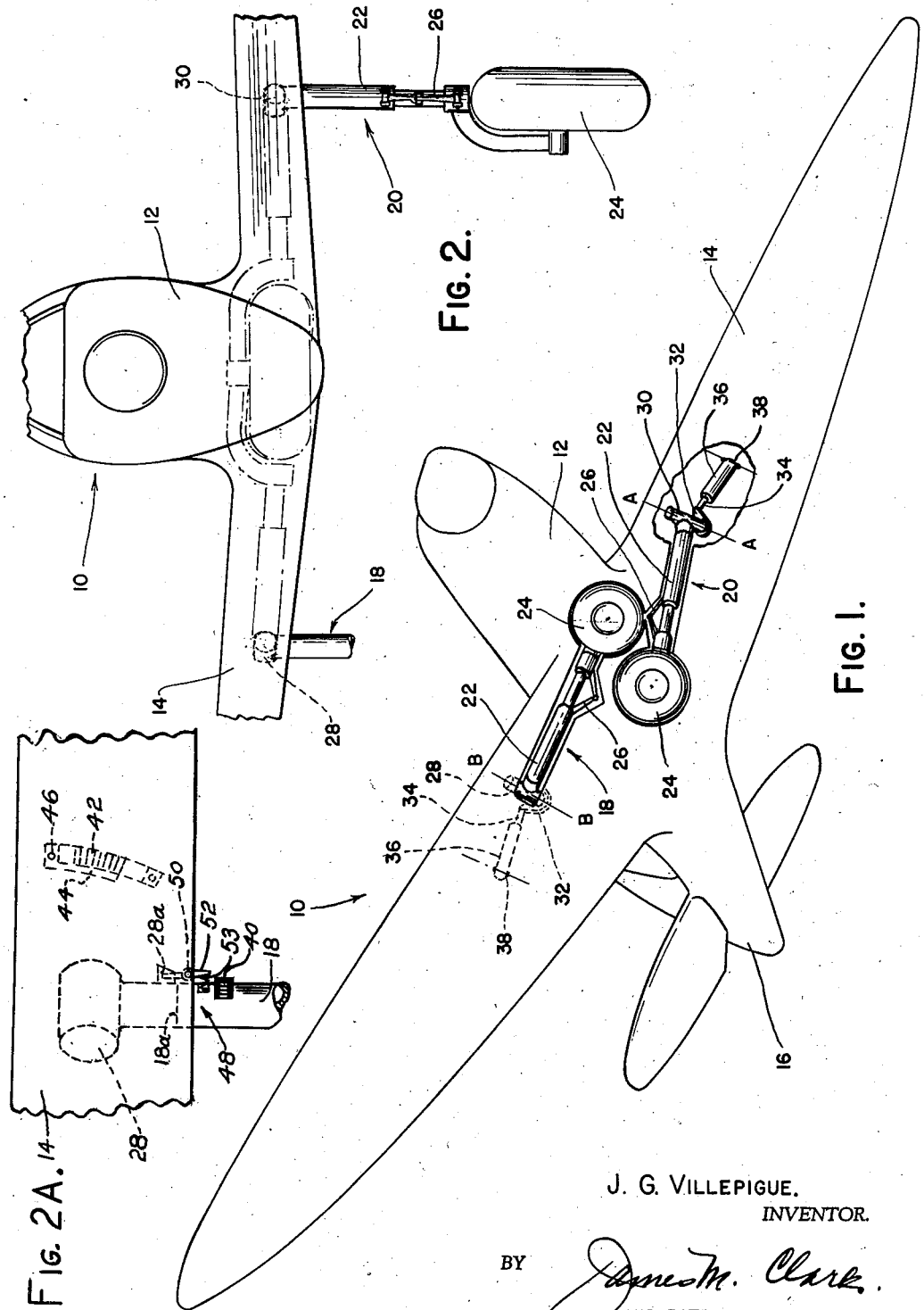
J. G. VILLEPIGUE,
INVENTOR.
BY *James M. Clark*
HIS PATENT ATTORNEY.

Patented July 9, 1946

2,403,835

UNITED STATES PATENT OFFICE 2,403,835

RETRACTABLE LANDING GEAR

Julius G. Villepigue, Inglewood, Calif., assignor to North American Aviation, Inc., Inglewood, Calif., a corporation of Delaware Application December 16, 1941, Serial No. 423,161

11 Claims. (Cl. 244—102)

This invention relates to retractable landing gears and has particular reference to an improved landing gear arrangement which permits the landing gear units to be folded up into an aircraft body portion with the landing wheels or ground engagers disposed in a tandem relationship with respect to the fore and aft axis of the aircraft.

Accordingly, one of the principal objects of this invention is to provide a landing gear capable of movement from the usual extended position in which the wheels are in laterally spaced arrangement parallel to the fore and aft axis of the aircraft, to a retracted position in which they lie flat and one behind the other, in a fore and aft sense. This is desirable in a landing gear designed especially for use in modern high speed aircraft in which every effort is made to reduce the frontal area of the body for the purpose of thereby reducing the attendant drag to the lowest possible degree. In attaining airplane designs of decreased aerodynamic resistance, the depth of the wing and the cross section of the fuselage have been gradually reduced to the point where the fuselage encompasses barely enough space to contain the body of the pilot in a sitting posture. It is even contemplated that for this and other reasons it may soon be necessary to dispose the pilot entirely in a prone position. With space considerations so important, it becomes necessary to take advantage of all available space to the fullest extent and even to devise new ways of utilizing such existing space to house the indispensable auxiliaries of airplanes.

By judicious design of the fuselage-wing combination, where the airplane cross section is especially small, and by a specially designed retractive arrangement as provided by this invention, it still remains possible to completely house the landing gear elements within the aircraft structure when in the retracted position. Therefore, it is a further object of this invention to utilize the available space in an aircraft in an arrangement adapted to receive and house the landing gear wheels partly within the aircraft wing and partly within its fuselage.

Carried to the full extent represented by the present arrangement, this reduction of the cross section of the aircraft results in a fuselage too narrow adjacent the undersurface to enclose a landing wheel of proper size while at the same time the wing is too shallow in depth at any point to provide the required room. Only by utilizing the combined space afforded within the wing and lower part of the fuselage can a single wheel be fully housed. Since the main landing gear of a conventional airplane consists of two wheel units, it thus becomes necessary to adopt some means by which the gear units can be retracted to lie in tandem along the length of the fuselage. It is also most desirable to have them lie flat in a plane substantially parallel to the horizontal. Thus still another object is to provide a retractive arrangement which causes rotation of the landing wheels from one plane to another during the time the landing gear is being moved from one extreme position to the other.

Another principal object is to provide a landing gear unit of the type employed in pairs to form a main landing gear installation, which unit is adapted to be used interchangeably in the installation either as the right hand unit or as the left hand unit of the pair.

Still another object is to produce an interchangeable landing gear unit of the retractable type having a skewed journal mounting adapted to cause the unit to retract forwardly or rearwardly of a mean line depending on whether the unit is swung in one direction or the other about its mounting pivot.

Other subsidiary objects are to provide a landing gear installation comprised of units adapted to accomplish the foregoing desired results while at the same time remaining of simple construction and reliable operation.

With the specified general objects and results in view as well as others which will become apparent during the course of the following description, this invention consists in certain novel features of design, construction and arrangement of elements which results in a certain method of stowage of a retracted landing gear, all as will be more particularly referred to and specified hereinafter.

Referring to the accompanying drawing;

Fig. 1 is a perspective view of the underside of an airplane fitted with a landing gear installation according to this invention;

Fig. 2 is a frontal view of a portion of the same airplane and landing gear combination; and Fig. 2A is a detailed view of a portion of Fig. 2 showing the strut rotation and locking means.

In the figures there is shown an aircraft 10 depicted as a low wing monoplane and comprised of a fuselage 12 supported by a wing 14 and fitted with an empennage 16. The fuselage of this airplane is intended to be representative of the type having an extremely small cross-sectional area as is now found in high-speed military fighting planes where the fuselage section is only as large as is required to enclose the propulsive power plant or the body of the pilot, whichever may have the larger cross section. At the same time, the wing has a plan form of minimum area as well as being of minimum depth. This is the type of airplane for which the present landing gear arrangement is particularly adapted although it does not follow that the present inventive arrangement is limited to employment in such an airplane as it could also be employed in replacement of more conventional landing gear types.

In the installation shown, the main landing gear equipment consists of right and left hand units 18 and 20 each of which is an exact duplicate of the other except for the fact that they are mounted on opposite sides of the fuselage center line. Each of these consists of a single cantilever strut 22 adapted to carry a ground engager or landing wheel 24 and for the sake of symmetry the units are disposed so that the wheel elements have corresponding faces placed in opposition. Each unit is formed of tubular elements in a two-part telescopic construction so that landing shocks can be absorbed by a more or less conventional oleo shock absorber built into the strut; and each is further equipped with nutcracker type torque links 26 which serve to keep the strut sections from twisting relatively to each other, whereby the landing wheel is retained in proper alignment with respect to the axis of the airplane.

The landing gear units are mounted on pivot journals 28 and 30, respectively, so as to hang below the lower surface of the wing 14 when the gear is in the extended attitude. These journals are fixed to the interior structure of the wing by any well known and convenient means but according to this invention they are so disposed as to have their pivot axes A—A and B—B in a non-parallel relationship with the fore and aft axis of the airplane on which they are installed. Thus in the arrangement shown, the axis B—B, if extended, would intersect the vertical plane containing the fore and aft axis in the rear portion of the airplane somewhere aft of the center of gravity while the axis A—A if similarly extended, would intersect the same plane in the front portion ahead of the center of gravity.

Furthermore, each pivot journal has a projecting arm 32 attached rigidly thereto, to which is pivotally connected the piston rod 34 of a hydraulic cylinder 36 which latter is pivotally attached as at 38 to the interior structure of the wing. Pressure fluid applied selectively to opposite ends of the cylinders is effective to swing the landing gear units above their respective pivot axes B—B and A—A as is well known in the art. Because such pressure systems are in common use, it is thought to be unnecessary to either show or further describe such a system in connection with the present invention. However, operation of the retracting mechanism serves to swing the separate landing gear units from the extended position, in which the landing wheels 24 are disposed in lateral alignment in vertical planes symmetrically arranged on either side of the fore and aft axis of the airplane and parallel thereto, upward and inward to the retracted position.

Due to the non-parallel or skew disposition of the pivot axes A—A and B—B, the landing gear units are also caused to have a third component of motion but in the respective units these third components are oppositely directed. That is, the unit 20 partakes of inward, upward and rearward motion while the unit 18 partakes of inward, upward and forward motion with the result that the wheels 24 move from the position of lateral alignment to one in which they are out of line in a lateral sense. As before explained, the fuselage 12 and wing 14 can be of an extremely small cross-section such that the wing-fuselage combination affords only sufficient cross-sectional area to fully accommodate the cross-sectional bulk of one of the landing wheels and its associated supporting structure disposed transversely therein, such that it would be entirely impossible for the wheels to be fully housed in a side by side or lateral relationship.

Thus both wheels can be fully housed by having the wheels arrive at a tandem disposition as a result of the retractive movements. With the skew arrangement of the axes A—A and B—B, the wheels are caused to pass each other during retraction and to finally lie within the outline of the airplane, one behind the other adjacent to the fore and aft centerline of the airplane, as is evident in Fig. 1. Also, as is shown in the drawing, the lateral spacing of the pivot axes is such as would cause the landing wheels to interfere with each other during retraction were it not for the skew arrangement of the retraction axes which prevents such interference. In other words, the lateral spacing between the pivot axes is less than the combined lengths of the landing gear units measured from the pivot point to the opposite side of the wheel. This is contrary to the mensural relationships found in conventional landing gears of the inwardly retracting type.

In order for the landing gear units to pass into the interior of the airplane, the lower skin surface is suitably cut-out for the purpose to provide individual wells and these may be provided with closures normally providing a flush continuation of the undersurface of the airplane. Such closures and the mechanism for operating them form no part of this invention.

In certain fuselage arrangements the simple journal mounting shown in the drawings might not be sufficient to bring the landing wheels into a retracted position in the most desirable attitude for stowage due either to the curvature of the undersurface of the wing and fuselage or to interference with other parts and equipment which may be housed in these portions of the aircraft. Accordingly, there is provided a secondary means, various forms of which have previously been suggested in retractable landing gears, to impart to the cylinder portion of the main strut 18 axial rotation relative to the journal fitting 28.

The mechanism by which this secondary movement is obtained is shown in the modification in Fig. 2A which is a corresponding front view of the right wing portion of the same airplane shown in Fig. 2. A suitable thrust bearing surface 18a is provided between the main strut 18 and the pivot fitting 28 and a toothed gear segment 40 is fixedly attached to the strut 18 below the said thrust bearing surface. A rack bar 42, provided with a marginal cam strip 44, is attached to the wing structure by the fastenings 46 in a position in which it will be engaged by the gear segment 40 as the landing gear passes through the final stage of its retractive movement. A lock unit 48 is pivotally mounted at 50 adjacent the upper extremity of the strut 18 and has oppositely extending dog portions 52, normally wedged into the locking condition by the spring 53. The lower dog portion is adapted to engage the cam strip 44 as the strut is retracted, thereby rotating the dog element about the pivot 50 such that the upper dog becomes disengaged from the locking lug 28a. The toothed gear segment and rack bar accordingly rotate the strut 18 axially with respect to the journal fitting 28 as the lock unit is disengaged to free the axial relationship between these strut portions, thereby permitting the wheel to be tilted to any desired angle.

The above described means for imparting axial rotation to the strut during retraction is but one of a number of satisfactory mechanisms available for this purpose. The present invention is, therefore, not specifically limited to an axial rotation mechanism of the type shown and described nor is it to be limited to the specific arrangement for locking the main strut to its pivot fitting in the extended position and unlocking the same during retraction to permit of the axial rotation. From the present disclosure and description it will be observed that there is provided a retractable landing gear installation in which each wheel moves from its operative position in a vertical plane transverse to the wing, to a position in a horizontal plane parallel to the undersurface of the wing or the fuselage, or to any angle of tilt of the wheels, and vice versa.

It should be further evident that there has been provided a landing gear unit which can be employed interchangeably in pairs in consequence of which the problem of supply has been greatly simplified. This is particularly true in the supply of repair units, for with the present interchangeable unit it is only necessary to maintain a stock of one type of unit instead of a stock of two types of structurally different units which could only be used as right or left hand units exclusively.

The airplane which has been selected for illustrative purposes only has been shown as the conventional type in which a tail wheel or skid would be provided beneath the empennage. The present invention is, however, equally applicable to aircraft having a nose wheel landing gear in which case the main landing gear struts 18 and 20 would be located farther aft toward the tail of the aircraft. In the embodiment shown as provided for a tail wheel, the center of gravity of the airplane would normally lie slightly aft of the transverse line joining the journalled upper ends of the oleo cylinders 22. In the case of a nose wheel type landing gear the strut journals would be disposed somewhat aft of the center of gravity of the airplane.

While there has been illustrated and described a particular mechanical embodiment of this invention, it is to be understood that it is not limited to the specific form herein described, but that certain changes in the shape and arrangement of parts may be resorted to as come within the scope of the appended claims.

What I claim is:

1. In an aircraft, a retractable landing gear installation comprising a pair of individual cantilever landing gear units, landing wheels carried by each said unit, individual pivot mountings for said units disposed on opposite sides of the fore and aft plane of symmetry of said aircraft on axes intersecting the plane of symmetry respectively fore and aft of the center of gravity of said aircraft and means adapted to rotate said units about the said axes for retraction of said wheels into fore and aft positions in the region of said plane of symmetry.

2. In a landing gear installation in which landing gear units are arranged for swinging from spaced extended positions in substantially parallel planes to tandem positions substantially in the same plane, the combination of journal mounts for each of said units disposed on axes skewed with respect to the said spaced positions, means adapted to cause rotation of each landing gear unit about its respective skewed axis and second means adapted to cause rotation of each of said gear units about an axis intersecting the skew axis thereof.

3. In a retractable landing gear, a pair of independent cantilever strut units, ground engaging means carried by each of said strut units, a journal mounting for each of said strut units equidistantly disposed on opposite sides of the fore and aft plane of symmetry on axes parallel to each other but angularly intersecting the said plane of symmetry at separate points, and means adapted to rotate each strut unit about its said journal mounting, said journal mountings being adapted to cause pivotation of the said strut units from a fore and aft retracted disposition of the said ground-engaging means in substantially the same plane in the region of said plane of symmetry to extended disposition in substantially parallel planes on opposite sides of said longitudinal plane of symmetry.

4. In a retractable landing gear for an aircraft, a pair of laterally disposed cantilever strut units, ground engaging means carried by each said strut unit, pivot mountings for said strut units equidistantly disposed with their axes of pivotation lying in a horizontal common plane on laterally opposite sides of the longitudinal plane of symmetry of the aircraft, the axes of the said pivots being angularly disposed in such manner that they intersect said reference plane of symmetry at spaced points fore and aft of the transverse line of said lateral disposition, and means adapted to retractively rotate said units about the said axes such that the respective ground engaging means adopt fore and aft tandem positions proximate to said plane of symmetry of the aircraft.

5. A retractable landing gear arrangement for an aircraft provided with a pair of landing units laterally disposed in their extended positions with respect to the longitudinal plane of symmetry of said aircraft, each said landing unit provided with a ground engaging element, mounting means for said laterally disposed landing units having axes asymmetrically but equidistantly located with respect to said longitudinal plane of symmetry, means to retract said laterally disposed units such that their ground engaging elements are disposed in fore and aft tandem relationship along said longitudinal plane of symmetry of the aircraft, and further means cooperating with said retracting means to cause said ground engaging elements to lie in a substantially common horizontal plane in their said retracted positions.

6. A retractable landing gear arrangement for an aircraft provided with a pair of landing units laterally disposed in substantially parallel planes in their extended positions on opposite sides of the longitudinal plane of symmetry of the aircraft, each said unit provided with ground engaging elements, each said landing unit having a pivot axis angularly disposed in such manner that it intersects the longitudinal plane of symmetry of the aircraft at a remotely spaced point in respect to the intersection of the other said landing unit pivot axis, each said landing unit arranged for its retraction inwardly towards the other landing unit and the longitudinal plane of symmetry of said aircraft in such manner that said ground engaging elements assume a fore and aft tandem relationship in their retracted positions, retracting means to cause said landing units to move between said extended and retracted positions, and means initiated by said extension and retraction adapted to impart secondary rotation to said ground engaging elements with respect to said units whereby they lie in a substantially common horizontal plane in their retracted positions and in substantially parallel vertical planes in their extended positions.

7. In an airplane, including a wing of finite thickness and a fuselage carried thereby, a pair of retractable landing gear units each carrying a wheel, the overall dimension through the axis of each said wheel being greater than the thickness of said wing, wheel wells disposed in tandem with respect to the longitudinal plane of symmetry of the airplane, each said wheel well extending from the under surface of the wing into the said fuselage and parallel pivot means for each said landing gear unit angularly disposed so that their axes intersect the said longitudinal plane of symmetry of the airplane at longitudinally spaced points, and means for retracting the said landing gear units in such manner that the wheels are swung from laterally aligned parallel positions beneath said wing to retracted tandem positions within the said wheel wells wherein they lie on the said longitudinal plane of symmetry of the airplane.

8. In an airplane of the low wing monoplane type including a fuselage carried thereby and retractable landing gear units fitted with landing wheels, each of said wheels being of an overall diameter substantially equal to the width of the fuselage, said landing gear units having an overall thickness through the wheel axis greater than the maximum depth of the monoplane wing, the combination of skewed mountings for said landing gear units on axes which are angularly disposed so that they intersect the longitudinal plane of symmetry of the airplane at spaced points, said mountings being equally spaced laterally on opposite sides of said longitudinal plane of symmetry, and means to retract said landing gear units from their parallel extended positions symmetrical to said longitudinal plane of symmetry into the space afforded by the combined depths of said fuselage and monoplane wing by causing one of said units to move upwardly and forwardly and the other of said units to move upwardly and rearwardly about their respective skewed mounting axes into tandem disposed positions along the said longitudinal plane of symmetry.

9. In a retractable landing gear for aircraft having a wing and a fuselage, said landing gear comprising two like units each provided with ground engaging wheels, means for rotatably mounting the units of said landing gear upon said wing at points equally spaced on opposite sides of the longitudinal plane of symmetry of said fuselage, the rotational axes of the said mounting means extending in substantial parallelism with respect to each other and being angularly disposed with respect to said longitudinal plane of symmetry, and rotative means for retracting said units toward the said fuselage, the said angular disposition of the said rotational axes causing retractive movement of the wheels from their extended disposition in substantially parallel vertical planes into a retracted position in a longitudinally tandem relationship within a substantially common horizontal plane.

10. In a landing gear installation for an aircraft, the combination of retractable landing gear units, ground engaging wheels carried by said units, journal mountings for said landing gear units equidistantly disposed and with their axes of pivotation angularly disposed with respect to the longitudinal plane of symmetry of the aircraft said axes at the same time lying in a common substantially horizontal plane, and means adapted to rotate each said landing gear unit about its angularly disposed journal mounting from a retracted disposition in substantially the same horizontal plane in which said wheels are longitudinally disposed with respect to each other to a side-by-side extended disposition in substantially parallel planes oppositely disposed and parallel with respect to said longitudinal plane of symmetry.

11. A retractable landing gear arrangement for an aircraft provided with a pair of landing units laterally disposed in their extended positions equidistantly with respect to the longitudinal plane of symmetry of the aircraft, each said landing unit provided with a ground engaging element, mounting means for said landing units having axes asymmetrically but equidistantly located on opposites of said longitudinal plane of symmetry and means to retract said laterally disposed units in such manner that their ground engaging elements are disposed when retracted in a longitudinal relationship along the said plane of symmetry of the aircraft.

JULIUS G. VILLEPIGUE.